(12) United States Patent
Zhang et al.

(10) Patent No.: US 8,077,994 B2
(45) Date of Patent: Dec. 13, 2011

(54) COMPRESSION OF MQDF CLASSIFIER USING FLEXIBLE SUB-VECTOR GROUPING

(75) Inventors: Qi Zhang, Redmond, WA (US); Wei Yu, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 854 days.

(21) Appl. No.: 12/134,690

(22) Filed: Jun. 6, 2008

(65) Prior Publication Data

US 2009/0304296 A1 Dec. 10, 2009

(51) Int. Cl.
*G06K 9/36* (2006.01)
*G06K 9/46* (2006.01)
*G06K 9/62* (2006.01)

(52) U.S. Cl. .................... 382/253; 382/224; 382/232

(58) Field of Classification Search .................. 382/181, 382/224, 225, 232, 243, 253
See application file for complete search history.

(56) References Cited

U.S. PATENT DOCUMENTS

| | | | |
|---|---|---|---|
| 4,959,870 A | 9/1990 | Tachikawa | |
| 5,890,110 A | 3/1999 | Gersho et al. | |
| 5,982,933 A | 11/1999 | Yoshii et al. | |
| 6,055,496 A * | 4/2000 | Heidari et al. | 704/222 |
| 6,253,173 B1 * | 6/2001 | Ma | 704/222 |
| 6,389,166 B1 | 5/2002 | Chang et al. | |
| 6,631,347 B1 * | 10/2003 | Kim et al. | 704/222 |
| 6,721,452 B2 | 4/2004 | Confer et al. | |
| 7,010,167 B1 | 3/2006 | Ordowski et al. | |
| 7,031,530 B2 | 4/2006 | Driggs et al. | |
| 7,174,043 B2 | 2/2007 | Lossev et al. | |
| 7,327,883 B2 | 2/2008 | Polonowski | |
| 2008/0014563 A1 | 1/2008 | Visani et al. | |
| 2008/0080449 A1 * | 4/2008 | Huang et al. | 370/342 |

FOREIGN PATENT DOCUMENTS

WO 2005034026 A2 4/2005

OTHER PUBLICATIONS

Wang; et al, "Gray-Scale Character Image Recognition Based on Fuzzy DCT Transform Features", 2000 IEEE, pp. 235-238.
Cheng-Lin Liu, "Handwritten Chinese Character Recognition: Effects of Shape Normalization and Feature Extraction" version 1, Chine Publications Liama <alain.monteil@sophia.inria.fr>, Dec. 14, 2006, 15 Pages.
Omachi; et al, "Precise Estimation of High-Dimensional Distribution and Its Application to Face Recognition" ,pp. 220-223, 2004, Proceedings of the Pattern Recognition, 17th International Conference on (ICPR'04) vol. 1.
Ge; et al, "A Study on the Use of CDHMM for Large Vocabulary Offline Recognition of Handwritten Chinese Characters", Proceedings of the Eighth International Workshop on Frontiers in Handwriting Recognition, 2002 IEEE, 5 Pages.

(Continued)

*Primary Examiner* — John Strege (57) ABSTRACT

Systems and methods to compress MQDF data are disclosed herein. A plurality of eigenvectors is identified. Each eigenvector in the plurality of eigenvectors can correspond to a pattern to be recognized. Each eigenvector in the plurality of eigenvectors can be split into sub-vectors. The sub-vectors can then be grouped into one or more groups according to a location of the sub-vectors within each of the eigenvectors. Each group can be associated with location data of the sub-vectors in the group. At least one group can be compressed according to a codebook. The codebook can be identifiable via the location data.

20 Claims, 11 Drawing Sheets

OTHER PUBLICATIONS

Linde; et al,"An Algorithm for Vector Quantizer Design", Jan. 1, 1980, pp. 84-95, IEEE Transactions on Communication, vol. com-28.

Long; et al,"Building Compact MQDF Classifier for Off-line Handwritten Chinese Characters by Subspace Distribution Sharing", Proceedings of the Ninth International Conference on Document Analysis and Recognition (ICDAR 2007) vol. 2, pp. 909-913, 2007, IEEE Computer Society.

Liu; et al, "Handwritten Character Recognition Using Gradient Feature and Quadratic Classifier with Multiple Discrimination Schemes" Aug. 29-Sep. 1, 2005 pp. 19-23 vol. 1.

Liu; et al, "Handwritten digit recognition: investigation of normalization and feature extraction techniques" 2003 Pattern Recognition Society. Published by Elsevier Ltd., accepted Jun. 14, 2003, pp. 255-279.

Liu; et al, "High Accuracy Handwritten Chinese Character Recognition Using Quadratic Classifiers with Discriminative Feature Extraction" Proceedings of the 18th International Conference on Pattern Recognition—vol. 02, 6 Pages, 2006.

Law; et al, "Split-Dimension Vector Quantization of Parcor Coefficients for Low Bit Rate Speech Coding" Speech and Audio Processing, IEEE Transactions, Jul. 1994, pp. 443-446.

Jain; et al, "Statistical Pattern Recognition: A Review", IEEE Transactions on Pattern Analysis and machine intelligence, Jan. 2000, pp. 4-37.

Bocchieri; et al, "Subspace Distribution Clustering Hidden Markov Model", IEEE Transactions on Speech and Audio Processing, Mar. 2001, pp. 264-275.

* cited by examiner

COMPRESSION OF MQDF CLASSIFIER USING FLEXIBLE SUB-VECTOR GROUPING

BACKGROUND

Pattern recognition aims to classify data patterns based on either a priori knowledge or on statistical information extracted from the patterns. The patterns to be classified are usually groups of measurements or observations, defining points in an appropriate multidimensional space. A pattern recognition system typically comprises a sensor that gathers the observations to be classified or described, a feature extraction mechanism that computes numeric or symbolic information from the observations, and a classification or description scheme that does the actual job of classifying or describing observations, relying on the extracted features. Pattern recognition systems are commonly used in speech recognition, document classification, shape recognition, and handwriting recognition.

The Modified Quadratic Discriminant Function (MQDF) is a statistical classification method that can be applied to the problem of pattern recognition, such as handwritten character recognition. MQDF classifiers can scale well with a large number of output classes, which makes them well suited to East Asian character recognition because East Asian languages include tens of thousands characters. An MQDF classifier stores a variable number of means, eigenvalues and eigenvectors that describe the characteristics of each class. The eigenvectors are chosen using principal component analysis of covariance matrices generated per class, and so are often referred to as principal components.

Commonly available implementations of MQDF classifiers store the same number of principal components for all output classes. One significant drawback of the existing MQDF classifier implementations is a large memory footprint. It is possible to reduce the memory footprint by reducing the number of principal components stored for each class, but reducing the number of principal components beyond a certain point may result in unacceptable classification accuracy degradation.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Embodiments are directed to reducing a memory footprint of an MQDF classifier without resulting in unacceptable classification accuracy degradation. Various methods to compress the eigenvectors of MQDF classifiers by applying flexible vector quantization are disclosed herein. Each eigenvector is split into several sub-vectors, and each sub-vector is grouped as part of a specific group. A clustering algorithm can be applied on each sub-vector group to generate a codebook. In the compressed MQDF model, instead of storing the original values of the sub-vector only indices of the sub-vectors in the generated codebooks are stored.

In order to further reduce memory footprint, access to multiple codebooks is performed by utilizing the sub-vector location associated with each sub-vector group. Thus, indexes for multiple codebooks are no longer needed. Furthermore, the present methods permit for flexibility to compress some portion of the eigenvectors, and left uncompressed other portions. In addition, using varying dimension sizes from group to group enables higher compression ratio for less significant sub-vectors. Thus, the overall compression ratio improved without affecting the classification accuracy.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

As briefly described above, a memory footprint of an MQDF classifier for a pattern recognition system may be reduced by grouping multiple sub-vectors according to the location of the sub-vectors in the corresponding vector. The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and the like. Embodiments may also be practiced in distributed computing environments where tasks are performed by remote processing devices that are linked through a communications network. In a distributed computing environment, program modules may be located in both local and remote memory storage devices.

Embodiments may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

Described herein are various techniques and technologies directed toward an implementation of the storage of MQDF data. Pattern recognition aims to classify data patterns based on either a priori knowledge or on statistical information extracted from the patterns. The patterns to be classified are usually groups of measurements or observations, defining points in an appropriate multidimensional space.

The classification or description scheme in a pattern recognition system is usually based on the availability of a set of patterns that have already been classified or described. This set of patterns is termed the training set and the resulting learning strategy is characterized as supervised learning. Learning can also be unsupervised, in the sense that the system is not given an a priori labeling of patterns, instead it establishes the classes itself based on the statistical regularities of the patterns.

The classification or description scheme usually uses one of the following approaches: statistical (or decision theoretic), syntactic (or structural). Statistical pattern recognition is based on statistical characterizations of patterns, assuming that the patterns are generated by a probabilistic system. Structural pattern recognition is based on the structural interrelationships of features. A wide range of algorithms can be applied for pattern recognition, from very simple Bayesian classifiers to much more powerful neural networks.

As explained above, the MQDF is a statistical classification used for pattern recognition. Because of the large footprint requirement of MQDF classifier, which limits its application in many scenarios such as in mobile phones, the present techniques provide for efficient methods to compress the model size of MQDF classifiers. More specifically, methods described herein permit the compression of the MQDF eigenvectors by applying a flexible split-dimension vector quantization.

Conventional methods of split-dimension vector quantization approach can be used to compress the eigenvectors. In conventional vector quantization, eigenvector is partitioned into a set of sub-vectors with the same dimension, and these sub-vectors are clustered into groups. One or more codebooks are generated based on the clustering results with each entry in the codebook corresponds to a specific cluster mean, where there is a one-to-one mapping between the cluster means and codebook entries. In the compressed model, each sub-vector is replaced by an index which points to a specific entry of a certain codebook. Having multiple codebooks requires extra bits of data to store indices that specify which codebook to use.

The techniques described herein utilize location-based grouping. In other words, sub-vectors of the MQDF eigenvectors can be grouped according to their location in the eigenvectors to which the sub-vectors belong. In addition, each group can be further partitioned into several sub-groups based on the types of classes these to which sub-vectors belong. This permits a clear indication of which codebook to use for sub-vector compression and decompression. Thus, location data of each sub-vector is used, eliminating the need for an additional index to indicate the appropriate codebook to use.

In some embodiments, compression methods described herein include selective compression. As such, some sub-vector groups can be compressed while others are not. As such, the MQDF data can be compressed maximally with minimum accuracy degradation.

In other embodiments, some sub-vector groups may be compressed with a higher compression ratio than other sub-vector groups. One technique that allows a variable compression ratio among sub-vector groups is the variable sub-vector dimensions among different groups. For example, all sub-vectors belonging to the one group can all have the one dimension, while all sub-vectors in another group can all have another dimension different from the dimension of the first group. In this way, less important, or easy to compress, groups can have a higher compression ratio than the other groups.

Figure 1:
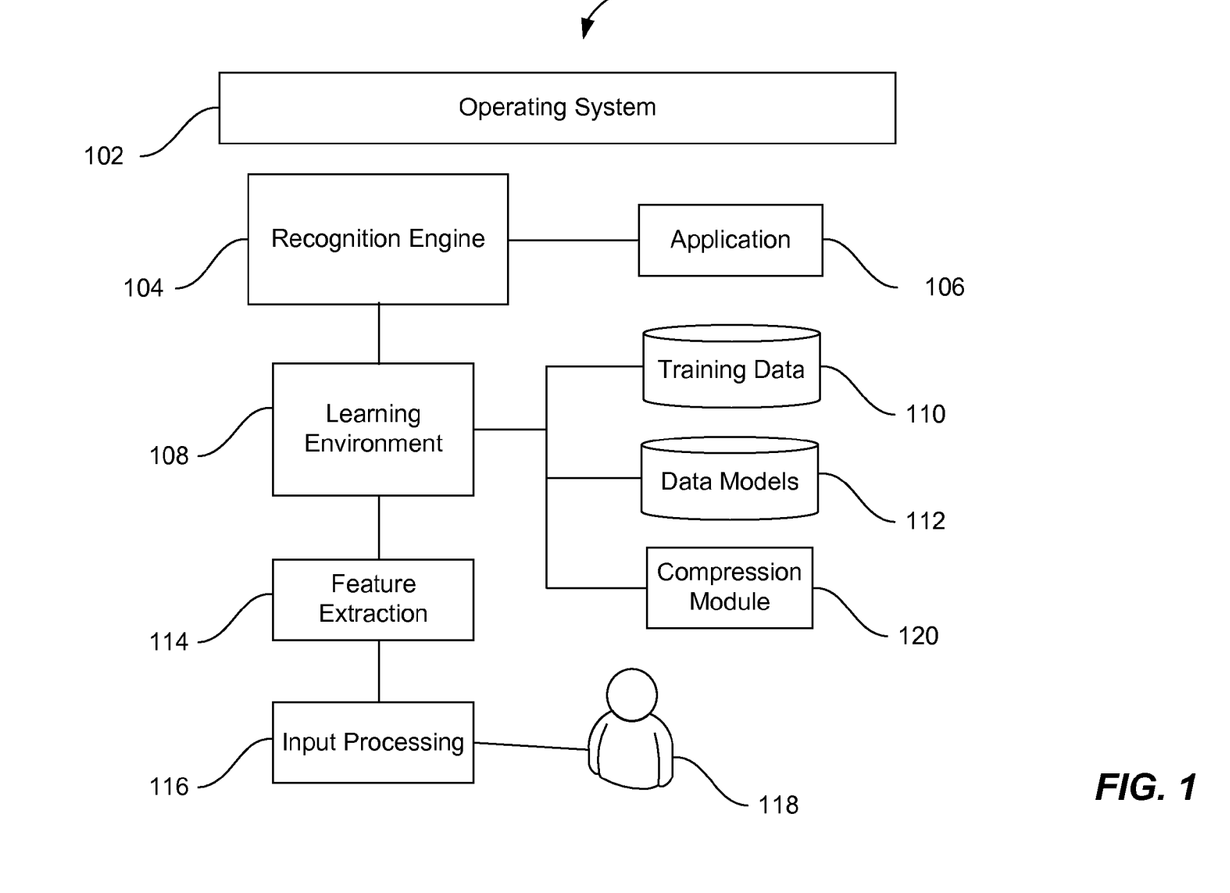
FIG. 1 illustrates a component diagram of a system for pattern recognition according to one embodiment.

FIG. 1 illustrates a component diagram of a system for pattern or pattern recognition according to one embodiment. An operating system 102 with multiple pattern recognition enabled applications may provide an example implementation scenario for some embodiments. The operating system 102 may typically control a number of applications (e.g. application 106) including a word processing application, a spreadsheet application, a media player application, and the like. Each application may use a different aspect of pattern recognition such as handwriting recognition, speech recognition, shape recognition, and so on.

In a typical pattern recognition system, two separate processes occur: training and runtime recognition. In the training process, training data 110 is processed through input processing 116 then feature extraction 114. As a result, data models 112 are generated by learning environment 108. As previously mentioned, data models can include MQDF data models. In addition, a compression module 120 can be configured to compress data models 112. The compression module 120 can use any compression technique. In one example, the compression module 120 uses codebooks for compression.

In runtime recognition process, operations begin with input processing 116 on input from a user 118 or from an information store (not shown). Depending on the pattern recognition type, the input may be speech, handwriting (digital ink), graphical input, and the like. For example, in a speech recognition system, an audio subsystem may convert sound input to audio signals which is then converted to textual data. The feature extraction module 114 can be configured to determine recognizable portions of the input data for processing in the learning environment 108.

Learning environment 108 in conjunction with recognition engine 104 may include a number of base recognition modules and a combiner for performing the pattern recognition. During pattern recognition, the recognition engine 104 input data is classified for software applications (e.g. application 106). Recognition engine 104 can use data modules 112 in order to perform pattern recognition.

In an example speech recognition system, the recognition engine 104 may be a speech recognition engine comprising a number of components such as a language modeling module, a training module, a language model customization module, and the like. Speech recognition engine may recognize words, phrases, and the like, based on customized language and acoustic models and provides textual versions of the audio utterances. A grammar service may perform the task of managing recognized text before it is provided to applications such as a word processing application. Similar examples can be given for handwriting recognition systems, shape recognition systems, and the like.

In performing recognition, the system typically uses classifiers to classify different classes of known patterns. Depending on complexity of each class and number of classes, large amounts of memory may be required to execute modules performing classification.

Components of a pattern recognition system may be loaded into a server, executed over a distributed network, executed in a client device, and the like. Furthermore, the components described herein are for illustration purposes only, and do not constitute a limitation on the embodiments. A flexible MQDF classifier model compression may be implemented using fewer or additional components in various orders. Individual components may be separate applications, or part of a single application. Moreover, the pattern recognition system or its components may include individually or collectively a user interface such as a web service, a Graphical User Interface (GUI), and the like.

The compression module 120 can be configured to compress the eigenvectors themselves. Thus, vector quantization can be applied to each group of sub-vectors where the sub-vectors are grouped based on the location of the each sub-vector within the eigenvector. Each eigenvector can correspond to a class in of a plurality of classes, each class corresponding to a pattern to be recognized. The compression module 120 can split each eigenvector in the plurality of eigenvectors into sub-vectors. In one embodiment, all eigenvectors in the plurality of eigenvectors are split into the same number of sub-vectors. The compression module 120 is further configured to group the sub-vectors into one or more groups. The groups can be generated according to the location or position of the sub-vectors within each of the eigenvectors. For instance, a given sub-vector group can be a group of sub-vectors that occupy location (0-1) in each eigenvector. Therefore, such sub-vector group can be associated with location (0-1). In addition, the group can be compressed according to a codebook. The codebook can be identifiable via the location data. For example, if the location data is (0-1), then such codebook can be utilized every time a sub-vector in location (0-1) is to be compressed or decompressed.

In another embodiment, each sub-vector group can also be partitioned into multiple subgroups, each subgroup having a different codebook. For example, if a data set of ten thousand eigenvectors, and ten sub-vector groups, each sub-vector group can be divided into two sub-groups. Each subgroup can then have five thousand sub-vectors. By doing this, we can further improve the clustering accuracy, which consequently improve the final classification accuracy. To enable this, we also need to set some flags in the global data structure to indicate how many subgroups each group has, and how those sub-vectors are partitioned between subgroups.

Figure 2A:
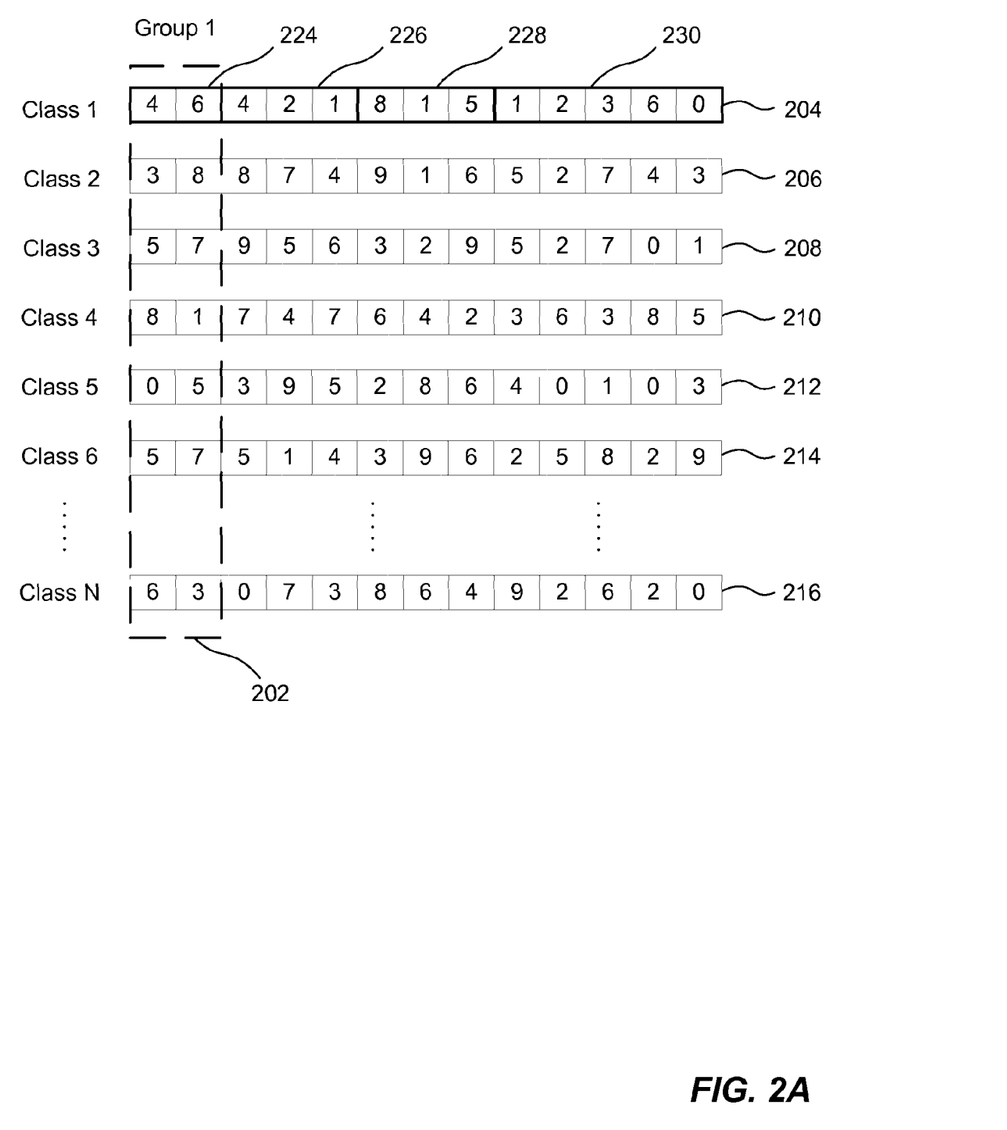
FIGS. 2A-2D illustrate exemplary diagrams of multiple classes and corresponding vectors according to one embodiment.

FIGS. 2A-2D illustrate exemplary diagrams of multiple classes and corresponding vectors according to one embodiment. In FIG. 2A, multiple classes can be provided, each corresponding to a pattern to be recognized. In one embodiment, each class can have at least one eigenvector. In another embodiment, each class can have more than one eigenvector. In another embodiment, one or more classes do not have a corresponding eigenvector. As such, each class can have zero or more corresponding eigenvectors.

In FIG. 2A, Classes 1 to N can have associated vectors 204-216. Each eigenvector can be partitioned into several sub-vectors, where different sub-vectors may have different dimensions. For instance, eigenvector 204 can be partitioned into sub-vectors 224, 226, 228, and 230. In addition, sub-vectors 224, 226, 228, and 230 can have different dimensions. For example, sub-vector 224 can have two dimensions, sub-vector 226 can have three dimensions, sub-vector 228 can have three dimensions, and sub-vector 230 can have five dimensions.

In one embodiment, all eigenvectors in all classes are partitioned in the same way. Namely, eigenvectors 206-216 can all be partitioned in the same way as eigenvector 204.

FIG. 2A illustrates various dimensions within each eigenvector. For explanatory purposes, each dimension will be referred according to a positional number in relationship to the eigenvector. Thus, for example, the leftmost dimension is at location 0, the second leftmost dimension is at location 1, and so on.

The sub-vectors can be grouped according to the location of the sub-vectors in the eigenvector to which each sub-vector corresponds. For example, group 202 (Group 1) can include sub-vectors that are grouped by virtue of having the same location. Namely, the sub-vectors in group 202 can be grouped based on being positioned in location (0-1).

Figure 2B:
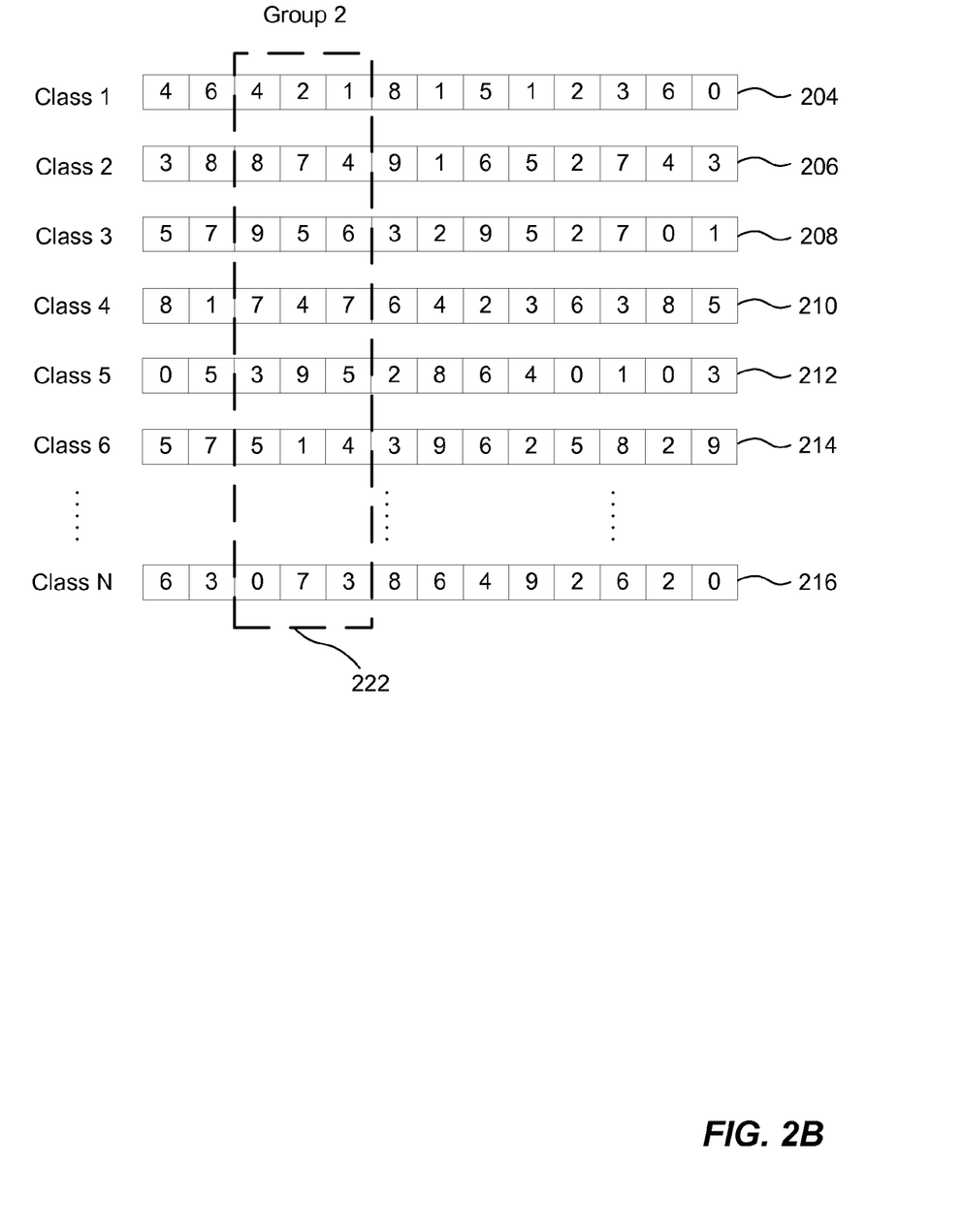
Figure 2C:
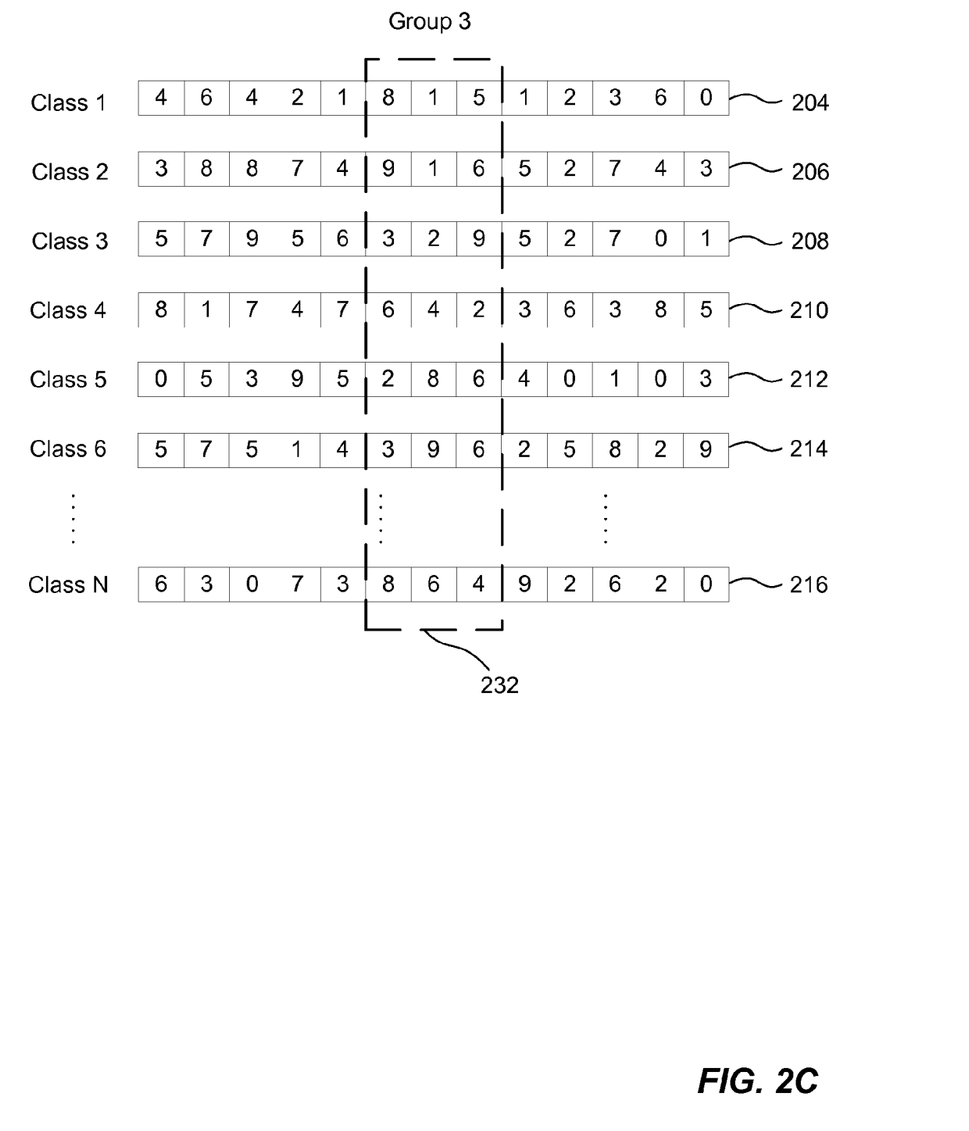

FIG. 2B illustrates an additional grouping. In particular, group 222 (Group 2) can include sub-vectors that are grouped by virtue of having the same location. Namely, the sub-vectors in group 222 can be grouped based on being positioned in location (2-4). FIG. 2C illustrates an additional grouping. In particular, group 232 (Group 3) can include sub-vectors that are grouped by virtue of having the same location. Namely, the sub-vectors in group 232 can be grouped based on being positioned in location (5-7).

Figure 2D:
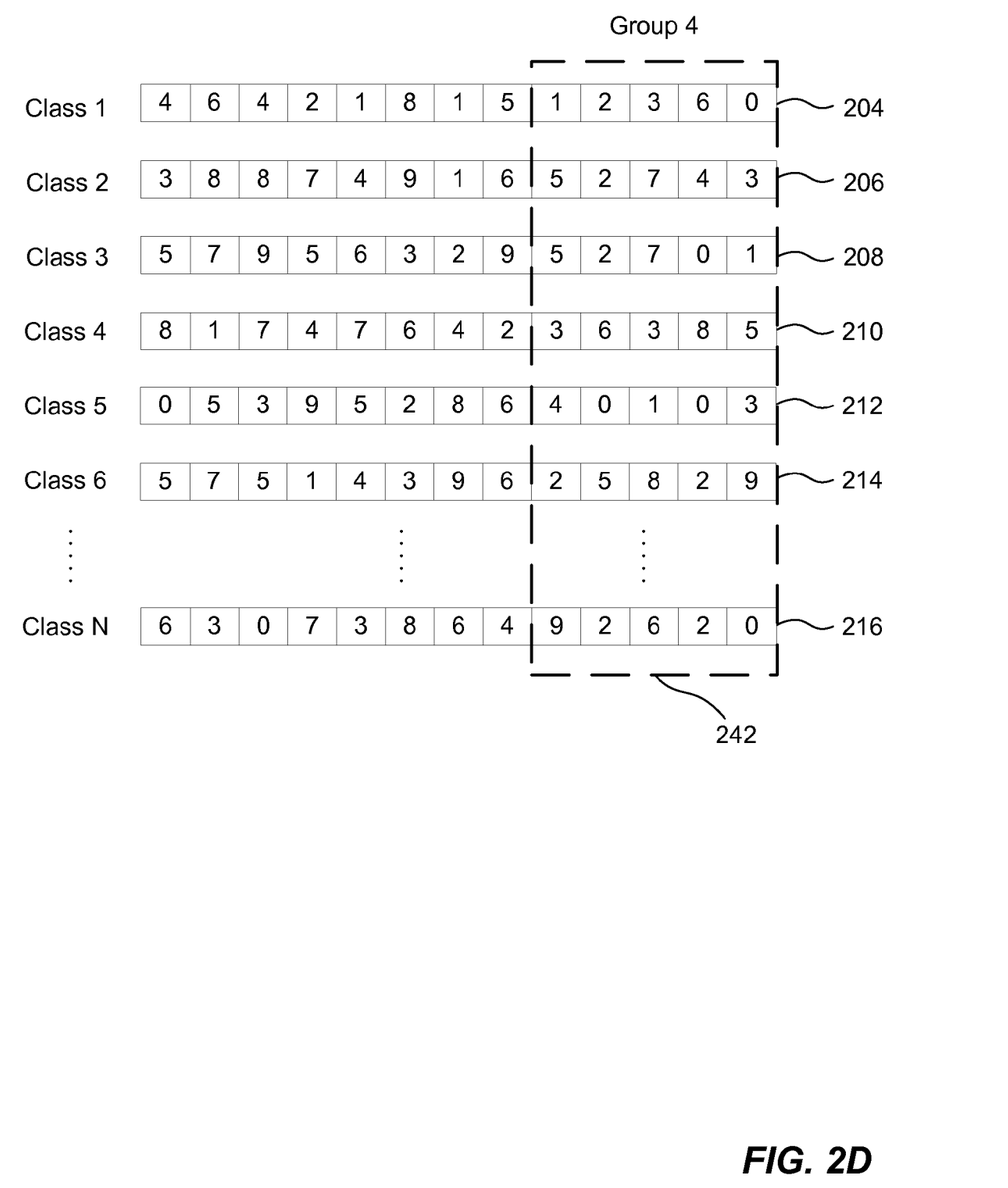

FIG. 2D illustrates an additional grouping. In particular, group 242 (Group 4) can include sub-vectors that are grouped by virtue of having the same location. Namely, the sub-vectors in group 242 can be grouped based on being positioned in location (8-12).

According to the methods described herein, compression of eigenvectors is flexible in multiple ways. In one embodiment, some groups may be compressed while others are not. In another embodiment, all sub-vector groups are compressed. Thus, for example, Group 1 may be configured to be left uncompressed, while the other groups can be compressed. In this example, leaving Group 1 uncompressed can provide the additional benefit of greater accuracy since the leftmost dimensions of the eigenvectors generally correspond to most significant data for purposes of pattern recognition. On the other hand, the rightmost dimensions of the eigenvectors correspond to least significant data for purposes of pattern recognition.

If a group is not to be compressed, then only the original values need to be stored, and a flag or other mechanism can be stored to indicate that the sub-vectors in Group 1 are not compressed. The additional bits to store such information may be minimal such that extra footprint overhead can be negligible.

In yet another embodiment, one or more groups may share a common codebook. Thus, if the same dimension is utilized by two groups, clustering can be executed a merged group that includes both groups.

In another embodiment, each sub-vector can have a different number of dimensions than other sub-vectors, and consequently each sub-vector group can be different in the number of dimensions as well. For example, group 202 has two dimensions and will be associated with a codebook that encodes sub-vectors of two dimensions. In another example, group 242 has four dimensions and will be associated with a codebook that encodes sub-vectors of four dimensions. Therefore, the MQDF data can be compressed according to a flexible mechanism that allows for easy calibration, efficient use of memory space, and minimal loss in accuracy of pattern recognition.

In the compressed MQDF model described herein, a global data structure to indicate how each eigenvector is partitioned into groups is provided. Thus, MQDF data structure can include indications of the number of sub-vectors, the dimension of each sub-vector, and which codebook is associated to which sub-vector group. In this global data structure shared by all classes and eigenvectors, a specification of which sub-vectors are not compressed can also be included.

Further, for each eigenvector of each class, if a sub-vector is not compressed, the original values can be stored. Otherwise, the index or pointer to the specific entry of the codebook can be stored. In addition, all the codebooks in the compressed model are also stored as part of the MQDF model. During recognition, each eigenvectors corresponding to a pattern can be recovered by looking up the global data structure and the codebooks.

Figure 3A:
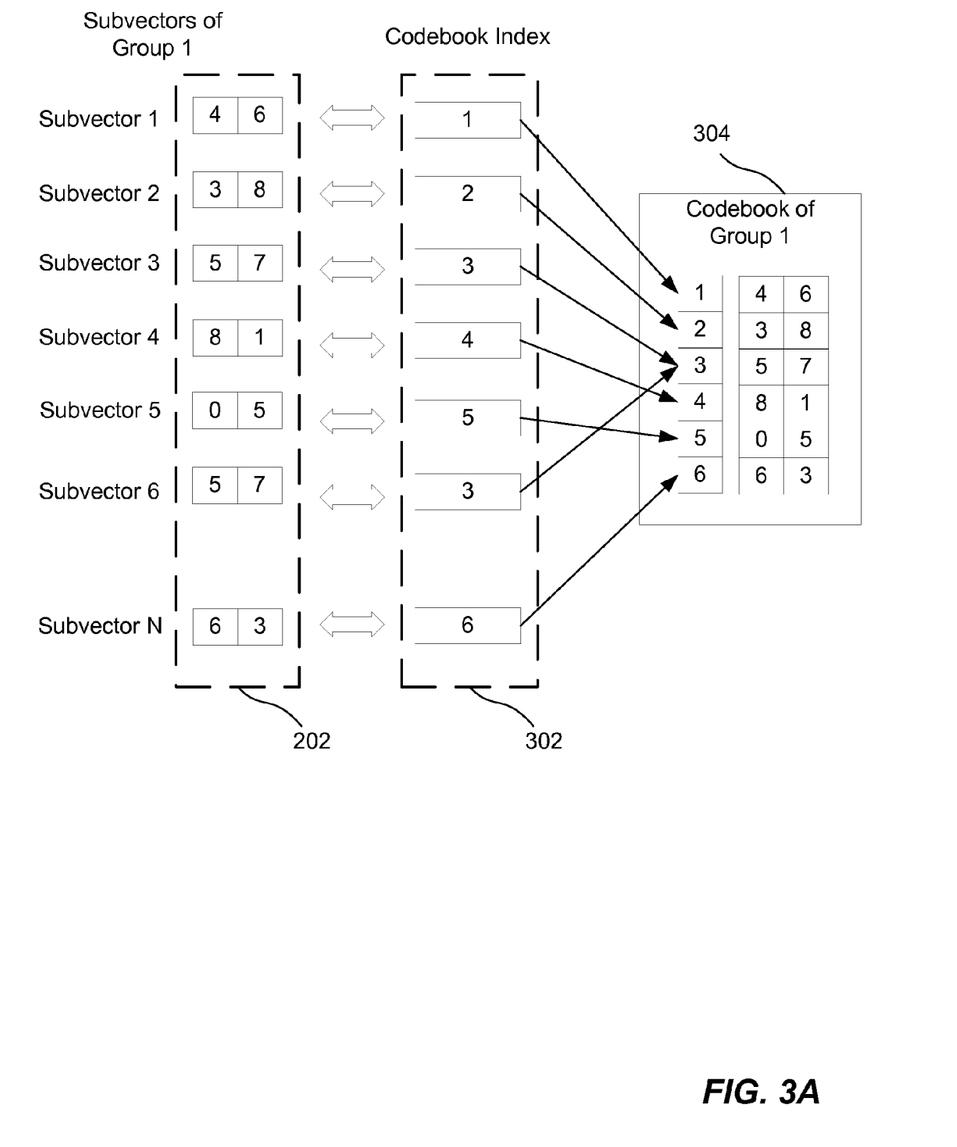
FIGS. 3A-3C illustrate sub-vector groups and corresponding codebooks according to one embodiment.
Figure 3B:
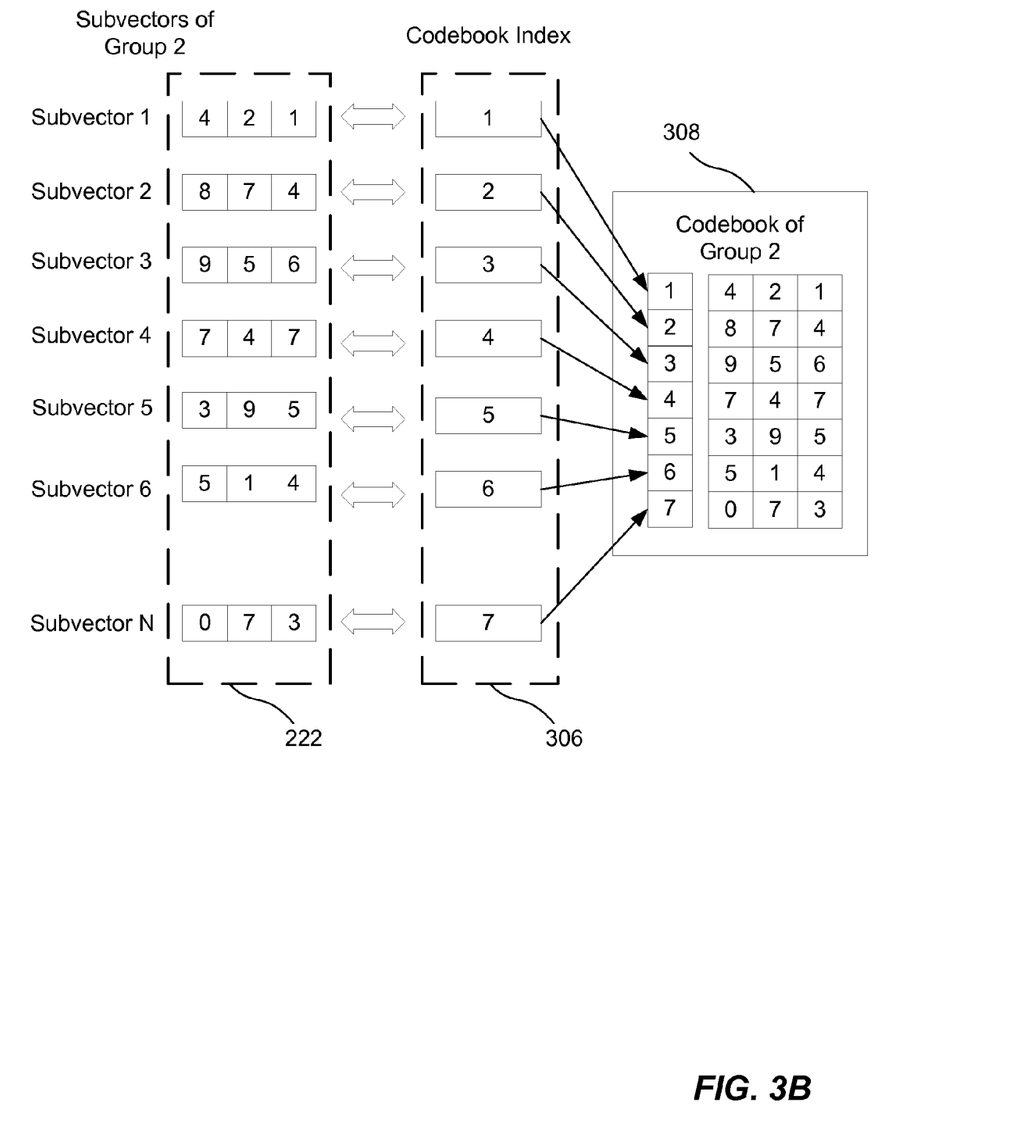
Figure 3C:
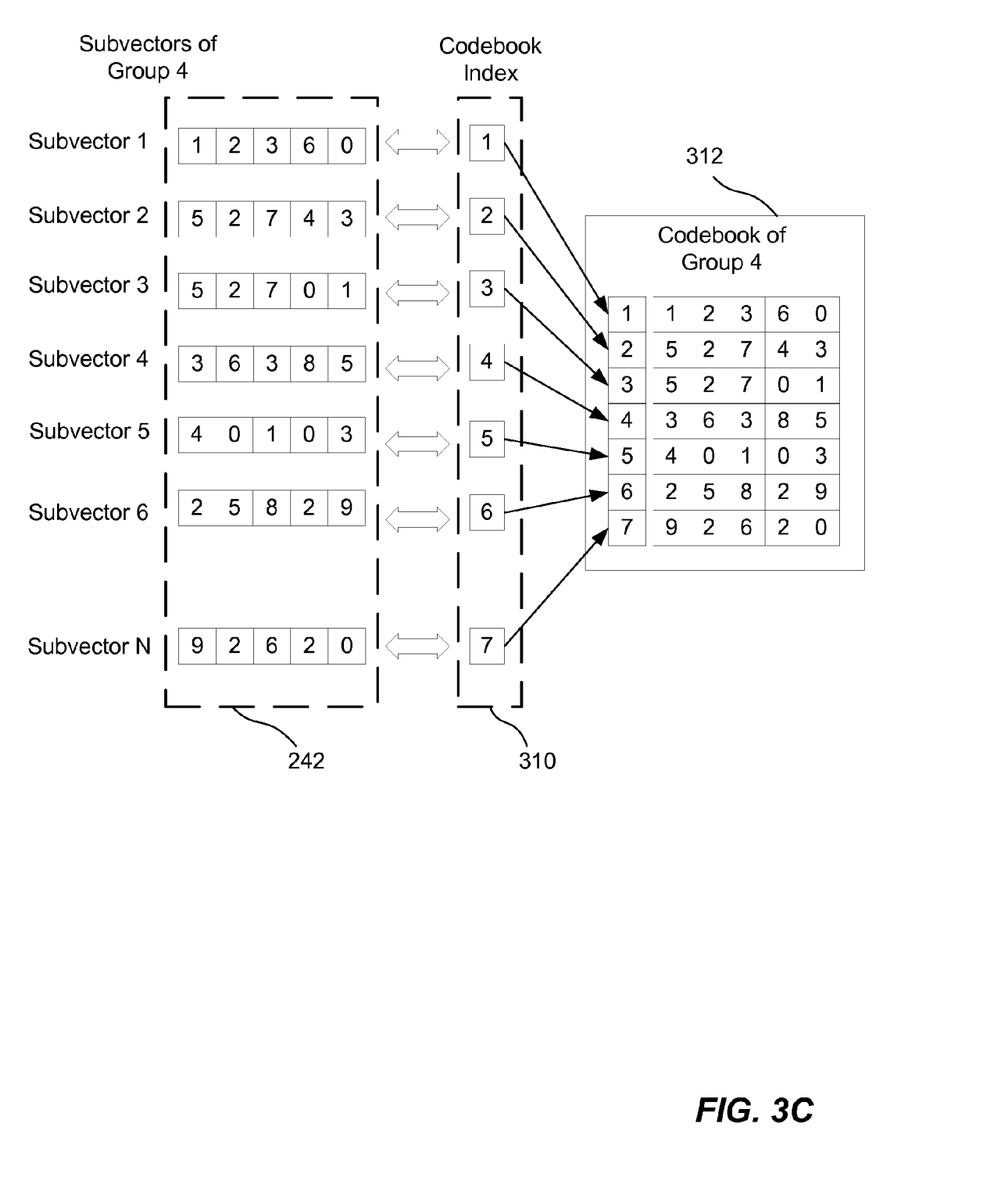

FIGS. 3A-3C illustrate sub-vector groups and corresponding codebooks according to one embodiment. For each sub-vector group, a clustering algorithm can be applied on the sub-vectors in this group and generate a codebook based on the cluster means. One of ordinary skill in the art can recognize that any clustering algorithm can be applied. In one embodiment, the number of codebook entries can be a predetermined number (e.g., 256 entries).

In one embodiment, for each sub-vector group that is compressed, several data bits can be used to indicate which codebook to use. In some embodiments, the data bits can include the address of the sub-vectors in the sub-vector group.

In addition, each sub-vector can be replaced by an index to a specific entry of the codebook. In one example, the entry is the clustering mean, or cluster centroid, of the clusters to which the sub-vector belongs. As shown in FIG. 3A, the codebook index 302 includes the replacement index entries which are associated with each sub-vector of group 202. For example, index 1 of codebook index 302 corresponds to an entry in codebook 304 being indexed with index 1 and a corresponding sub-vector entry {4, 6}. Index 2 of codebook index 302 corresponds to an entry in codebook 304 being indexed with index 2 and a corresponding sub-vector entry {3, 8}, and so on. Each index can be used to replace the sub-vector in the eigenvector in order to achieve compression.

FIG. 3B, shows another example of grouping and compression for Group 2. For example, the codebook index 306 includes the replacement index entries which are associated with each sub-vector of group 222. For example, index 1 of codebook index 306 corresponds to an entry in codebook 308 being indexed with index 1 and a corresponding sub-vector entry {4, 2, 1}. Index 2 of codebook index 306 corresponds to an entry in codebook 308 being indexed with index 2 and a corresponding sub-vector entry {8, 7, 4}, and so on. Each index can be used to replace the sub-vector in the eigenvector in order to achieve compression.

FIG. 3C, shows another example of grouping and compression for Group 4. For example, the codebook index 312 includes the replacement index entries which are associated with each sub-vector of group 242. For example, index 1 of codebook index 310 corresponds to an entry in codebook 312 being indexed with index 1 and a corresponding sub-vector entry {1, 2, 3, 6, 0}. Index 2 of codebook index 310 corresponds to an entry in codebook 312 being indexed with index 2 and a corresponding sub-vector entry {5, 2, 7, 4, 3}, and so on. Each index can be used to replace the sub-vector in the eigenvector in order to achieve compression. While specific dimensions are used in the previous examples, sub-vectors can have any number of dimensions.

Figure 4:
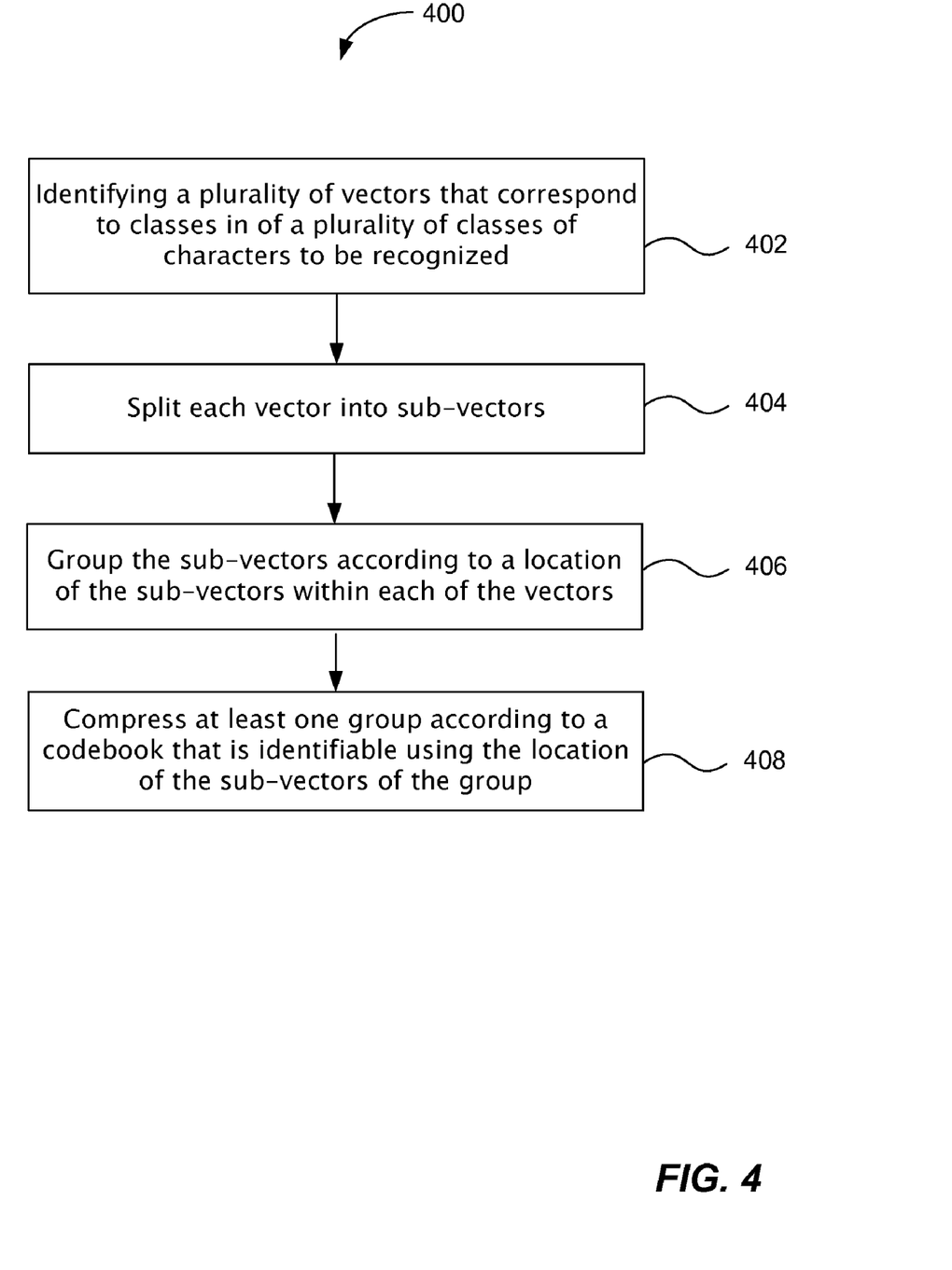
FIG. 4 illustrates a flow diagram of a process for a flexible compression MQDF training process according to one embodiment.

FIG. 4 illustrates a flow diagram of a process 400 for a flexible compression MQDF training process according to one embodiment. At process block 402 a plurality of eigenvectors is identified. Each eigenvector in the plurality of eigenvectors can correspond to a class in of a plurality of classes. Each class can correspond to a pattern to be recognized. Process 400 continues at process block 404.

At process block 404, each eigenvector in the plurality of eigenvectors is split into sub-vectors. All eigenvectors in the plurality of eigenvectors can be split into the same number of sub-vectors. Process 400 continues at process block 406. At process block 406, the sub-vectors are grouped into one or more groups. The sub-vectors can be grouped according to a location of the sub-vectors within each of the eigenvectors such that each group in the one or more groups is associated with location data. Process 400 continues at process block 408.

At process block 408, at least one group of the one or more groups is compressed. The at least one group can be compressed according to a codebook. The codebook can be identifiable via the location data.

Figure 5:
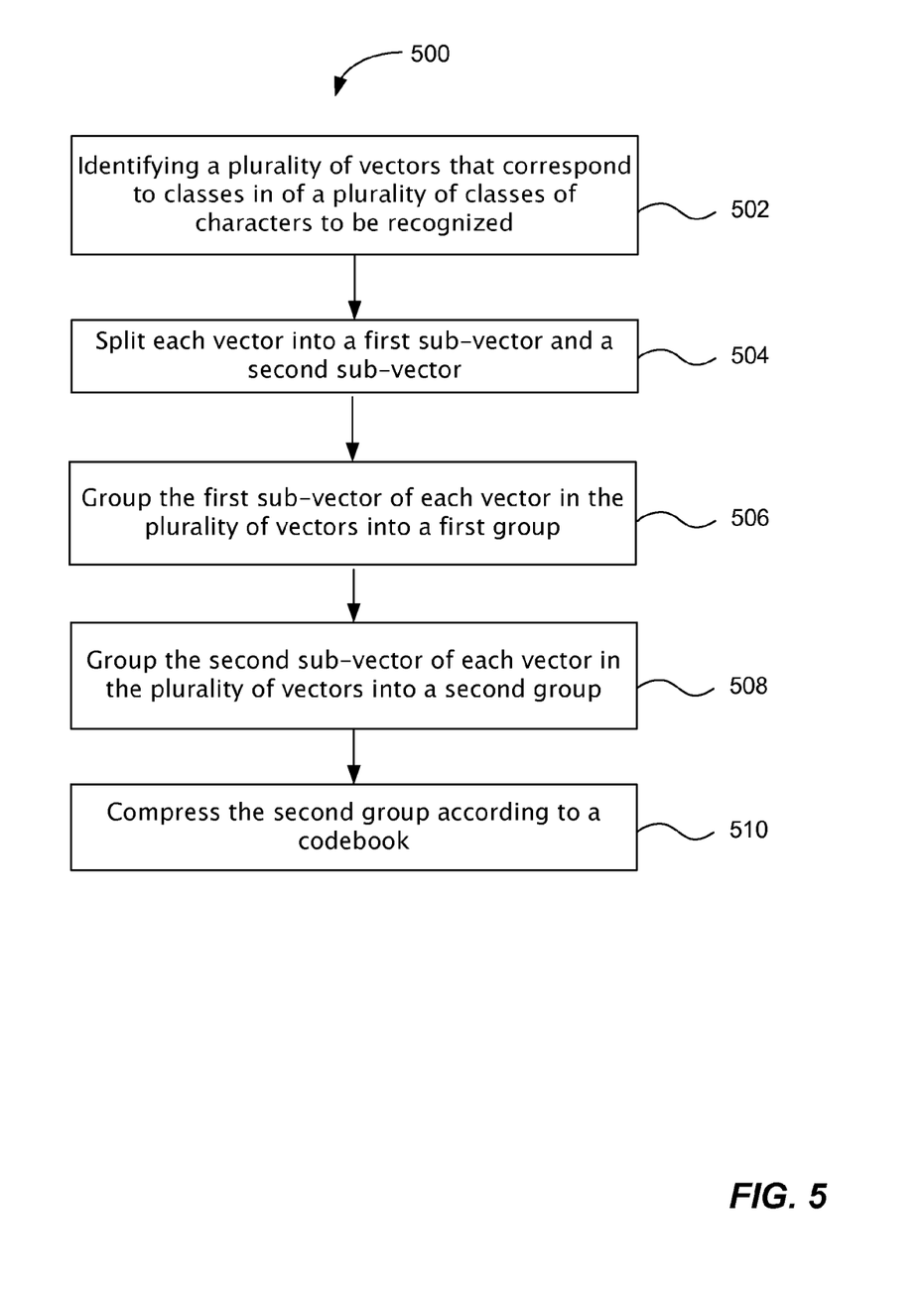
FIG. 5 illustrates a flow diagram of a process for a flexible compression MQDF training process according to another embodiment.

FIG. 5 illustrates a flow diagram of a process 500 for a flexible compression MQDF training process according to another embodiment. At process block 502, a plurality of eigenvectors is identified. Each eigenvector in the plurality of eigenvectors can correspond to a class in of a plurality of classes. Each class can correspond to a pattern to be recognized. Process 500 continues at process block 504. At process block 504, each eigenvector in the plurality of eigenvectors is split into at least a first sub-vector, and a second sub-vector. Process 500 continues at process block 506.

At process block 506, the first sub-vector of each eigenvector in the plurality of eigenvectors is grouped into a first group. Process 500 continues at process block 508. At process block 508, the second sub-vector of each eigenvector in the plurality of eigenvectors is grouped into a second group. Process 500 continues at process block 510. At process block 502, the second group is compressed using a codebook.

Figure 6:
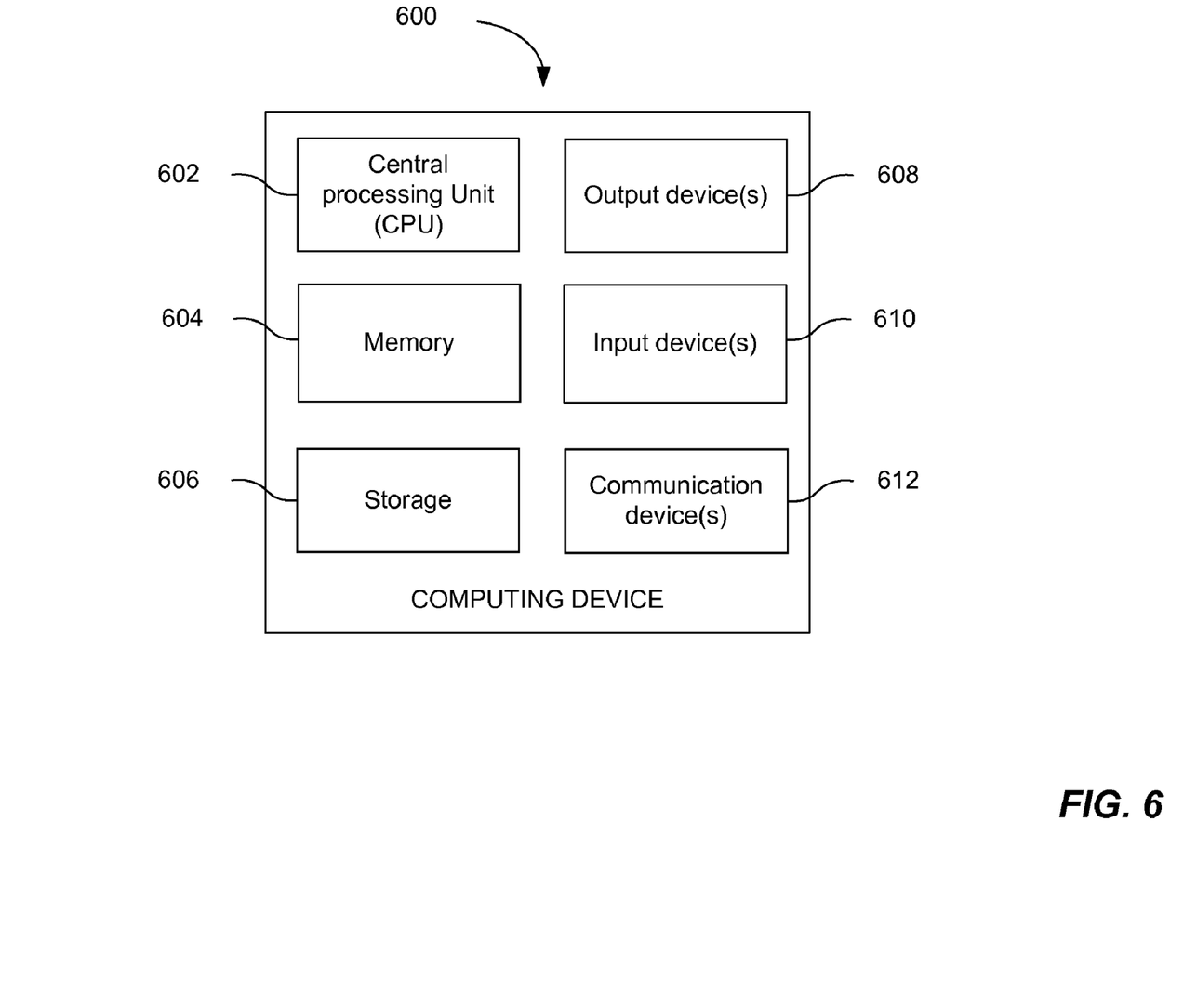
FIG. 6 illustrates a component diagram of a computing device for implementing one or more embodiments.

FIG. 6 illustrates a component diagram of a computing device according to one embodiment. The computing device 600 can be utilized to implement one or more computing devices, computer processes, or software modules described herein. In one example, the computing device 600 can be utilized to process calculations, execute instructions, receive and transmit digital signals. In another example, the computing device 600 can be utilized to process calculations, execute instructions, receive and transmit digital signals, receive and transmit search queries, and hypertext, compile computer code, as required by the consumer recognition engine 104, learning environment 108, application 106, compression module 120, feature extraction 114, and input processing 116.

The computing device 600 can be any general or special purpose computer now known or to become known capable of performing the steps and/or performing the functions described herein, either in software, hardware, firmware, or a combination thereof.

In its most basic configuration, computing device 600 typically includes at least one central processing unit (CPU) 602 and memory 604. Depending on the exact configuration and type of computing device, memory 604 may be volatile (such as RAM), non-volatile (such as ROM, flash memory, etc.) or some combination of the two. Additionally, computing device 600 may also have additional features/functionality. For example, computing device 600 may include multiple CPU's. The described methods may be executed in any manner by any processing unit in computing device 600. For example, the described process may be executed by both multiple CPU's in parallel.

Computing device 600 may also include additional storage (removable and/or non-removable) including, but not limited to, magnetic or optical disks or tape. Such additional storage is illustrated in FIG. 6 by storage 206. Computer storage media includes volatile and nonvolatile, removable and non-removable media implemented in any method or technology for storage of information such as computer readable instructions, data structures, program modules or other data. Memory 604 and storage 606 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing device 600. Any such computer storage media may be part of computing device 600.

Computing device 600 may also contain communications device(s) 612 that allow the device to communicate with other devices. Communications device(s) 612 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer-readable media as used herein includes both computer storage media and communication media. The described methods may be encoded in any computer-readable media in any form, such as data, computer-executable instructions, and the like.

Computing device 600 may also have input device(s) 610 such as keyboard, mouse, pen, voice input device, touch input device, etc. Output device(s) 608 such as a display, speakers, printer, etc. may also be included. All these devices are well known in the art and need not be discussed at length.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The invention claimed is:

1. A computer-implemented method of compressing Modified Quadratic Discriminant Function (MQDF) data, comprising:
   identifying a plurality of eigenvectors, each eigenvector in the plurality of eigenvectors corresponding to a class in a plurality of classes, each class corresponding to a pattern to be recognized;
   splitting each eigenvector in the plurality of eigenvectors into a number of sub-vectors, wherein all eigenvectors in the plurality of eigenvectors are split into the same number of sub-vectors;
   grouping the sub-vectors into one or more groups, the sub-vectors being grouped according to a location of the sub-vectors within each of the eigenvectors such that each group in the one or more groups is associated with location data; and
   compressing at least two of the groups of the one or more groups to form compressed groups, each one of the at least two compressed groups being compressed according to a different codebook among multiple codebooks, each different codebook being specific to the group being compressed and identifiable via the location data for each compressed group.

2. The method of claim 1, wherein compressing comprises performing vector quantization such that dimensions of the sub-vector are coded in a codebook and mapped to a codebook entry.

3. The method of claim 1, wherein at least one group is compressed, and another group is not compressed.

4. The method of claim 1, wherein at least one group is compressed using a codebook corresponding to two dimensions, the at least one group having sub-vectors of two dimensions.

5. The method of claim 1, wherein at least one group is compressed using a codebook corresponding to three dimensions, the at least one group having sub-vectors of three dimensions.

6. The method of claim 1, wherein at least one group is compressed using a codebook corresponding to four dimensions, the at least one group having sub-vectors of four dimensions.

7. The method of claim 1, further comprising:
   receiving an input pattern to be recognized;
   determining a sub-vector of an eigenvector that corresponds to the input pattern; and
   determining a codebook to be used according to the location data of the sub-vector.

8. The method of claim 1, wherein the location data corresponds to a position of the sub-vector in the eigenvector to which the sub-vector belongs.

9. The method of claim 1, wherein the location data corresponds to a position of the sub-vector in the class to which the sub-vector belongs.

10. A computer-implemented method of compressing MQDF data, comprising:
    identifying a plurality of eigenvectors, each eigenvector in the plurality of eigenvectors corresponding to a class in a plurality of classes, each class corresponding to a pattern to be recognized;
    splitting each eigenvector in the plurality of eigenvectors into at least a first sub-vector, a second sub-vector, and a third sub-vector;
    grouping the first sub-vector of each eigenvector in the plurality of eigenvectors into a first group;
    grouping the second sub-vector of each eigenvector in the plurality of eigenvectors into a second group;
    grouping the third sub-vector of each eigenvector in the plurality of eigenvectors into a third group; and
    compressing the first group, the second group, and the third group using multiple codebooks, wherein compressing includes:
      compressing the first group using a first codebook;
      compressing the second group using a second codebook; and
      compressing the third group using a third codebook.

11. The method of claim 10, wherein the first, second, and third sub-vectors each have a different number of dimensions.

12. The method of claim 10, wherein the first, second, and third sub-vectors have the same number of dimensions.

13. The method of claim 10, wherein the third group has a number of dimensions that is larger than a number of dimensions of the first group and a number of dimensions of the second group.

14. The method of claim 10, wherein the first sub-vector, the second sub-vector, or the third sub-vector of each eigenvector has a dimension size that is of two dimensions, three dimensions, or four dimensions.

15. A computer-implemented method of compressing MQDF data, comprising:
    identifying a plurality of eigenvectors, each eigenvector in the plurality of eigenvectors corresponding to a class in a plurality of classes, each class corresponding to a pattern to be recognized;
    splitting each eigenvector in the plurality of eigenvectors into at least a first sub-vector, and a second sub-vector;
    grouping the first sub-vector of each eigenvector in the plurality of eigenvectors into a first group;
    grouping the second sub-vector of each eigenvector in the plurality of eigenvectors into a second group;
    leaving the first group uncompressed; and
    compressing the second group using a codebook.

16. The method of claim 15, wherein the first sub-vector and second sub-vector each has a different number of dimensions.

17. The method of claim 15, wherein the first sub-vector and second sub-vector have the same number of dimensions.

18. The method of claim 15, further comprising:
    further splitting each eigenvector in the plurality of eigenvectors into a third sub-vector;
    grouping the third sub-vector of each eigenvector in the plurality of eigenvectors into a third group; and
    compressing the third group using a different codebook.

19. The method of claim 15, further comprising:
    receiving an input pattern to be recognized;
    identifying the second sub-vector to correspond to the input pattern; and
    accessing the codebook to be used based on location data of the second sub-vector.

20. The method of claim 15, further comprising:
    merging the first group and the second group into a third group; and
    compressing the third group using an additional codebook.

* * * * *